UNITED STATES PATENT OFFICE.

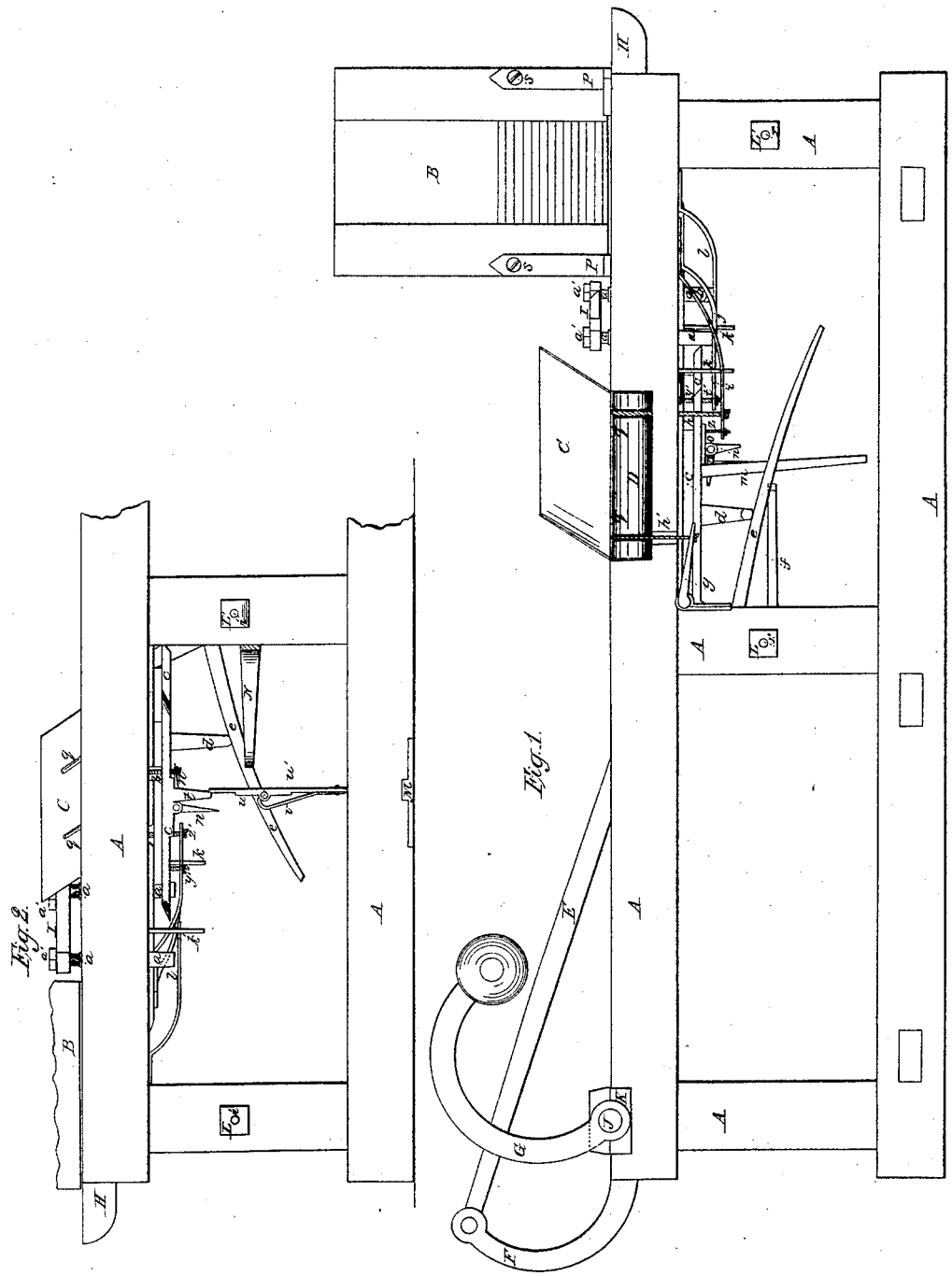

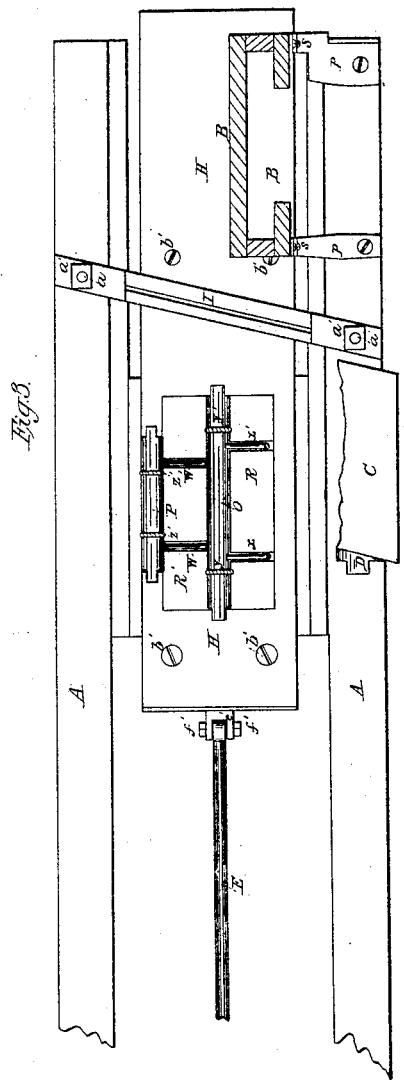

W. A. JARRATT, OF PATONSVILLE, TENNESSEE.

SHINGLE-MACHINE.

Specification of Letters Patent No. 17,378, dated May 26, 1857.

*To all whom it may concern:*

Be it known that I, WM. A. JARRATT, of Patonsville, county of Williams, in the State of Tennessee, have invented a new and useful Improvement in Shingle-Shaving Machines; and I do hereby declare that the following is a full and exact description thereof, reference being had to the accompanying drawings and to the letters of reference marked thereon.

The nature of my invention consists in certain improvements, as hereinafter described; in machines for shaving shingles, whereby I am enabled to effectively shave both sides of the rifts with one knife economically, the whole being so arranged that the work is automatically performed.

To enable others skilled in the art to make and use by invention I will proceed to describe its construction and operation, reference being had to the accompanying drawings, where Figures 1 and 2 represent side elevations and Fig. 3 partial top view of my machine; the frame work of which is representd by (A, A, &c.).

(H) is the carriage or traveling table which runs upon suitable ways on the frame (A,) and is driven backward and forward by the pitman (E,) one end of which is attached to the end of said carriage, the other coupled to the crank (F,) on shaft (J,) which latter is rotated or driven in any desirable way. In the upper part of table (H,) is formed a recess (R, &c.) of the form seen at (Fig. 3,) to accommodate the rifts and hold them while being shaved.

(B,) is the feeder or depot in which the rifts are placed.

(I,) is the knife which is secured to the upper ends of the vertical studs ($a$, $a$,) by nuts ($a'$, $a'$,) said studs pass through mortises or bearings in the upper frame work and are supported by springs ($j$, $l$,), (when not cutting) said springs being bolted, at their rear ends, to the under side of the upper frame and having their front ends working in the slotted stands ($k$, $k'$,).

(O,) is a small shaft or rock stud which works in suitable bearings in the table (H,) and which is let in, little more than half its diameter, below the surface of the bottom of the recess (R,) and on which are two arms (X, X',) which lay their whole diameter below the bottom of the recess (R,) or have their top sides even with the bottom of said recess, in order to lay under the rift, when the latter is in said recess; the shaft (O) with its arms is oscillated about one quarter of a revolution, by the cords ($y$, $y'$,), ($y$) being attached at its lower end, to the lever ($m$,) which is operated by the stop ($f$,) and ($y'$) fastened to the spring ($t'$,).

(P,) is another rock shaft constructed somewhat similarly to (O,) being operated by the cords ($z$, $z'$,) in the following manner; the cord ($z$) is attached at its lower end to the pivoted "knee-lever" ($u$, $u$,) and the cord ($z'$) to the spring ($i$,). Now as the carriage moves along the dog ($t$) comes in contact with the spring bar ($u$,) and bends the latter to a proper degree of tension when it passes the dog and suddenly strikes the vertical leg of the knee ($u$) thereby causing a sudden jerk upon the cord ($z$,) which in turn suddenly turns the shaft (P,) raising its arms ($w'$, $w$,) on which the shingle lays and which thus throw the shingle out of the machine.

The spring bar ($u$) is formed of two parts ($u$) and ($u'$) hinged together, in order that the upper end may yield, when the dog ($t$,) returns; the upper of said bar is retained in its vertical position by means of a spring ($v$,).

(C,) is a sheet metal apron which is secured tangential to the upper side of the cylinder (D,) which is oscillated on its bearings in a manner somewhat similar to shafts (O,) and (P,) the cord ($h$) being secured to the spring ($i$) and the cord ($h'$) to the lever ($g$,) which has a long arm ($e$,) and is turned upon its pivot by means of the dog, ($d$) running up on said long arm and depressing; the horizontal position of the apron is regained by the cord ($h$) being pulled back or down by the spring ($i$,). The feeder (B) is firmly supported in a vertical position by means of cast iron L's.

($p$, $p$,), ($r$, $r'$,) are brace rods passing through the opposite posts of the frame work and tying the same, being fastened by nuts (L, L',).

The operation of my machine is as follows: The rifted blocks are placed in the feeder (B,) which is made of the proper size to admit them flatwise without allowing room enough for them to turn over during their descent in said feeder. As the recess (R,) of the carriage (H,) passes under the feeder a rift is discharged into said recess, when the carriage recedes with the rift in said recess, the bars (c) on the bottom of the carriage taking hold of the cams (h,) on studs (a) and thus pulling down the knife (I,) to cut the rift to the proper thickness and holding the said knife in this position until the cut is made, as the shingle leaves the knife (having one side shaved) the said knife is released and rests on the springs under the studs (a, a,) as before described, and the dog (d,) running up on the arm (e,) depresses the lever (g,) which pulls the cord (h,) and raises the apron (C,) which received the shavings while the shingle was passing under it and the knife, and which now throws them off clear of the machine while at the same time the bar (m,) comes in contact with the stop (f,) and pulling down the cord (y,) causes the stud on rock shaft (o,) to oscillate the arm (x x') of which rising from the recess (R) and bearing the shingle having one side shaved turns it over, into the recess (R'.) When the carriage now changes its direction of motion and the apron (C,) returns to its horizontal position while the shaft (O) reverses its motion bringing the arms (x x',) into the recess (R,) ready to receive another rift. And the bars (c,) now operating on the bottom of the cams (b,) on studs (a a,) raise the knife in order that the rift now in the recess (R',) may return under the knife, and retain the knife while said return is made, when the recess (R) arrives under the feeder and receives another rift which passes under the knife the whole machine operating as before described but it will be observed that the knife is now also shaving the other side of the rift which passed through the first time in recess (R,) and which is now held in recess (R'). As the shavings are thrown off the spring bar (u) having been put to tension by the dog (t) strikes the lever or knee (n) and thus through the cord (z',) being attached to or around the shaft (P,) the arms (w w',) of the latter are suddenly raised whereby the first rift which has now been shaved on both sides is thrown out of the recess (R',) to make room for the next, and the rifts successively shaved on one side turned over into the recess (R',) shaved on the other and then thrown out of the machine the knife (I,) always shaving two rifts on different sides at the same time.

Having thus fully described the construction and operation of my machine, for shaving shingles, what I claim as my invention and desire to secure by Letters Patent is—

1. Elevating and depressing the knife (I,) and retaining the same in the required positions, by means of the bars (c, c,) on the bottom of the carriage operating upon the cams (b,) of studs (a, a) substantially as described.

2. The automatic apron (C,) operating substantially as described whereby the shavings are all taken from the shingles and knife and thrown from the machine the apron returning successively to a horizontal position to receive the shavings, as and for the purpose hereinbefore set forth.

I do not claim the mechanism for reversing and throwing out the shingles as I am aware these mechanisms equivalent thereto have been before employed.

In testimony whereof I have hereunto set my hand.

W. A. JARRATT.

Witnesses:
WILLIAM S. ANDREWS,
JOSEPH M. HARRIS.